United States Patent
Gschwender et al.

(10) Patent No.: US 11,498,295 B2
(45) Date of Patent: Nov. 15, 2022

(54) DEVICE FOR SEALING PNEUMATIC TIRES

(71) Applicant: Aircom Automotive Sp. z o.o. Sp. k., Pietrzykowice (PL)

(72) Inventors: Dominik Gschwender, Göppingen (DE); Jakub Jęśkowiak, Ujazd Górny (PL)

(73) Assignee: Aircom Automotive Sp. z o.o. Sp. k., Pietrzykowice (PL)

( * ) Notice: Subject to any disclaimer, the term of this patent is extended or adjusted under 35 U.S.C. 154(b) by 0 days.

(21) Appl. No.: 17/261,269

(22) PCT Filed: Jul. 17, 2018

(86) PCT No.: PCT/EP2018/069438
§ 371 (c)(1),
(2) Date: Jan. 19, 2021

(87) PCT Pub. No.: WO2020/015826
PCT Pub. Date: Jan. 23, 2020

(65) Prior Publication Data
US 2021/0276289 A1     Sep. 9, 2021

(51) Int. Cl.
*B29C 73/16*    (2006.01)
*B29C 73/02*    (2006.01)
*B29L 30/00*    (2006.01)

(52) U.S. Cl.
CPC .......... *B29C 73/166* (2013.01); *B29C 73/025* (2013.01); *B29L 2030/00* (2013.01)

(58) Field of Classification Search
CPC ... B29C 73/166; B29C 73/025; B29C 73/163; B29L 2030/00; B67D 7/0238;
(Continued)

(56) References Cited

U.S. PATENT DOCUMENTS 4,337,322 A    6/1982   Jaspon
5,909,752 A *   6/1999   Gerresheim .......... B29C 73/166
                                                  141/38
(Continued)

FOREIGN PATENT DOCUMENTS

CN         1960850 A     5/2007
CN     101848803 A     9/2010
(Continued)

OTHER PUBLICATIONS

International Search Report Form PCT/ISA/210, and Written Opinion Form PCT/ISA/237, International Application No. PCT/EP2018/069438 pp. 1-9 International Filing Date Jul. 17, 2018 mailing date of search report dated Apr. 18, 2019.
(Continued)

*Primary Examiner* — Timothy P. Kelly
(74) *Attorney, Agent, or Firm* — George McGuire (57) ABSTRACT

The invention relates to a device for sealing pneumatic tires by means of sealing liquid, having a sealing liquid container having an air inlet opening for connection to a compressor and an outlet opening for the discharge of an air/sealing liquid mixture into a pneumatic tire to be sealed, the sealing liquid container having at least two chambers in which components of the sealing liquid that are reactive to one another are stored separately, the chambers being separated from one another by a closed connecting element which can be opened via a pressure and/or an air flow from the air inlet opening to the outlet opening.

15 Claims, 7 Drawing Sheets

(58) Field of Classification Search
CPC .. B65D 25/08; B65D 25/082; B65D 81/3211; B65D 81/3255
See application file for complete search history.

(56) References Cited

U.S. PATENT DOCUMENTS

| | | | |
|---|---|---|---|
| 6,605,654 B1* | 8/2003 | Fang | B29C 73/166 523/166 |
| 7,854,242 B2* | 12/2010 | Stehle | B29C 73/166 141/38 |
| 2006/0217662 A1* | 9/2006 | Hickman | B29C 73/166 604/153 |
| 2008/0098855 A1 | 5/2008 | Cegelski et al. | |
| 2016/0194144 A1* | 7/2016 | Marini | B65D 85/70 220/359.4 |

FOREIGN PATENT DOCUMENTS

| | | |
|---|---|---|
| DE | 102004009299 A1 | 9/2005 |
| DE | 102007015833 A1 | 10/2008 |
| DE | 102007026776 A1 | 12/2008 |
| DE | 102011115856 A1 | 4/2013 |
| DE | 102016209302 A1 | 12/2017 |

OTHER PUBLICATIONS

Translated First Office Action, p. 1-6.

\* cited by examiner

DEVICE FOR SEALING PNEUMATIC TIRES

CROSS-REFERENCE TO RELATED APPLICATIONS

This is a National Stage Application filed under 35 U.S.C. 371 based on International Patent Application No. PCT/EP2018/069438, filed on Jul. 17, 2018, the disclosure of which is incorporated herein by reference in its entirety.

BACKGROUND

The invention relates to a device for sealing pneumatic tires by means of sealing liquid, comprising a sealing liquid container having an air inlet opening for connection to a compressor and an outlet opening for the discharge of an air/sealing liquid mixture into a pneumatic tire to be sealed.

Tire sealants have been used in pneumatic tires for a long time, since the use of spare tires no longer appears to be profitable and expedient, as it used to be, for reasons of space but also due to the infrequent damage to tires. These tire sealants are normally intended for the short-term repair of tire emergencies where a hole or tear or opening occurs in a tread and wall of a tire. The tire sealant is inserted through the tire valve and temporarily closes the hole or opening. The tire is then replaced.

Conventional tire sealants are based on a latex-rubber base substance. They form a rubber-like mass in the tire. In addition, latex residues are difficult to remove from a tire. The changed tires must also be disposed of as hazardous waste. Due to the sticky consistency, the systems become very dirty when changing tires and can only be cleaned again with great effort.

Furthermore, the environment is polluted by this product. Finally, the procurement costs are subject to very high market fluctuations, since it is a limited natural product.

In this case, substantially two systems are known for the application, namely a "standard system" in which a sealing liquid can be provided in a compressible container, such as a compressible plastic bottle or a bag, and the sealing liquid is manually pressed into the tire by compressing the compressible container. The sealing is then carried out both mechanically by "clogging" and by coagulation in the opening, with the assistance of a chemical reaction of the sealing liquid. The container is connected to the tire valve via a hose. Subsequent inflation of the tire and the rotating and flexing movement while driving further strengthen the sealing effect.

There are also "comfort systems" in which the sealing liquid container is connected to a compressor that can be operated via a connection in the vehicle, for example. The sealing liquid is then carried along by the air flow and brought to the damaged part. The sealing then takes place as described.

A sealing liquid is known, for example, from U.S. Pat. No. 4,337,322, which, inter alia, contains a latex component in addition to other components.

In addition, several latex-free sealing liquids are known, for example from DE 10 2011 115 856 A1.

DE 10 2004 009 299 A1 discloses a design with a sealant bottle having at least two chambers, the arrangement being intended to prevent mixing of components in the sealant bottle.

In order to ensure reliable sealing, a latex content of more than 50 wt. % has previously been selected for sealing liquids based on latex, so that usability can be provided in accordance with the requirements over the required temperature range. In addition, precise mixing ratios are necessary for this, which creates additional outlay.

SUMMARY OF THE INVENTION

The object of the invention is now to provide a device which avoids the problems mentioned and in particular reduces the amount of latex to be used.

This object is achieved by a device having the features of claim 1, in which the sealing liquid container has at least two chambers in which components of the sealing liquid that are reactive to one another are stored separately, the chambers being separated from one another by a connecting element, e.g. a valve, which can be opened via an applied pressure from the compressor and/or an air flow from the air inlet opening to the outlet opening. This means that as soon as a sufficient, predetermined pressure is applied, the connecting element, e.g. the valve, opens and the air flows from one chamber through the connecting element into the second chamber and from there further into the tire, the two components being mixed with one another. This ensures that the components of the sealing liquid that are reactive to one another come into contact with one another only when used and that no premature reaction occurs which would then anticipate the reaction when used.

In order to ensure that, even after years of use, sufficient quantities of the reacting components are still present, they have had to be added in larger quantities in the prior art in the past. In addition, an exact mixing ratio had to be adhered to in order to ensure a safe reaction. Because the components are now separated, the proportion of reacting components can be reduced. Latex-natural rubber, in particular, is provided here as the reacting component, the use of which has caused procurement problems in the past, in particular due to the proportion required. The chambers are separated by a valve that is opened by the incoming air, mixing the components and introducing them into the tire. The valve can alternatively be provided as a destructible closure, for example a film or membrane provided with a predetermined breaking point, which is then destroyed by the air flow or opened by mechanical actuation.

According to a preferred embodiment, the latex-natural rubber proportion is less than 50 wt. %, in particular less than 40 wt. %, in particular less than 30 wt. % and in particular less than 25 wt. %. The latex proportion can therefore be significantly below the proportion provided in the prior art, such that the problems caused by the latex can be reduced.

The terms sealing liquid and sealant are synonyms in the present case. Liquid should be understood to mean both aqueous and viscous liquids or gels.

According to a further preferred embodiment, the sealing liquid can comprise mineral and/or synthetic fibers and/or particles. These particles or fibers can further promote the closure of an opening, by interlocking in the opening, with the material surrounding the opening, and with one another. The latex material supports this process.

Foam additives and/or evaporation agents can be further components of the sealing liquid. These can contribute to the distribution as well as to the coagulation and the closing of the opening.

It is particularly advantageous if the air inlet opening of the sealing liquid container can be coupled directly to an air outlet of a compressor. In this way, a stable connection that appears to be valuable can be provided and, in particular, the expense of further connecting parts can be dispensed with. The sealing liquid container can preferably be arranged on the compressor in the direction of use. The air outlet opening of the compressor is provided on its upper side and the air inlet opening of the sealing liquid container on its lower side. In this way, the distance that is to be bridged by means of a connection device or a connection means, in particular a connection hose, to the tire valve can be shortened. It is particularly advantageous if the outlet opening of the sealing liquid container is provided on its upper side in the use position.

It is also preferred for the outlet opening of the sealant container to be closed by a destructible closure. The destruction can take place by an applied pressure and/or the air flow and/or a connection means for connecting to the pneumatic tire. Advantageously, the destroyed closure can be fixed in such a way that it does not protrude into the airway and thus impede the filling process. In this way, the sealing liquid container is tightly closed in the storage state and can easily be opened when in use. For this purpose, the closure can have a predetermined breaking point in order to ensure opening when the closure is subjected to a defined pressure.

According to another preferred embodiment, the air inlet opening can have a valve which opens when the air flows into the sealing liquid container from the compressor and closes automatically after the filling process when the compressor is switched off. The valve can be designed such that it deforms when it is subjected to compressed air and thus releases a path which, after the air has been introduced into the sealing liquid container, closes again by elastic re-deformation. Alternatively, a design is also conceivable in which the valve releases a path by shifting a valve element and, when the air flow ends, closes the opening again or deforms after the end of the air flow in order to reliably prevent leakage of sealing liquid.

Particularly preferably, an air guide inside the compressor can be designed such that the very high air temperature at the outlet of the cylinder of the compressor is reduced. If the air temperature is rather low when entering the sealing liquid container, this prevents the risk of a preliminary reaction, especially when the sealing liquid passes through the coupling, for example from a hose to the tire valve, and in particular problems when passing through the tire valve. Such a cooling device in the compressor can be achieved, for example, by means of different cooling surface geometries or channels in the interior of the compressor as well as a correspondingly adapted outer shape of the compressor, the air being passed through this cooling device.

Furthermore, it is particularly advantageous that a temperature reduction of the air at the compressor outlet means that a hose material for coupling either the sealing liquid container to the compressor and/or the sealing liquid container to the tire has to be less temperature-stable, so that materials can be used which can be produced much more precisely and so as to have thinner walls due to the production process. In addition, a—subsequently possible—thinner, more flexible hose material makes it easier to accommodate the hose or another connection device. In addition, the hose or the connection device used also cools down more quickly. In the prior art, both silicone and natural rubber hoses having fabric coverings are known, which can now be improved.

It is also particularly preferred for the sealing liquid container to be produced as an injection-molded part. In the prior art, blow molding processes are often used to produce the plastics containers. By means of injection molding technology, however, higher specific strength values can be achieved, which can be produced with considerably smaller tolerances. In this way, the wall thicknesses of the containers can be reduced, which leads to savings in both cost and weight.

Finally, in a particularly preferred embodiment elastic deformation occurs, in particular on the side of the compressor, in particular a housing wall of the compressor, in the course of the coupling of the sealing liquid container and the compressor, and in this way a frictional connection of the connection is achieved and thus a particularly tight connection between the sealing liquid container and the compressor is produced.

The elastic deformation can take place, for example, via a bayonet clamping guide or a clamping ramp and a clamping spigot or bolt. The compressor housing has a coupling element for the connection between the sealing liquid container and the compressor, to which coupling element the air inlet opening of the sealing liquid container is attached and connected to the air outlet opening of the compressor. In this case, a connection can be carried out in particular in a rotary manner, but also by translational plugging and latching.

BRIEF DESCRIPTION OF THE DRAWINGS

These and other features of the invention can also be found in the following description as well as in the drawings and the claims.

The invention is explained in more detail in the following with reference to the drawings, in which.

DETAILED DESCRIPTION

Figure 1:
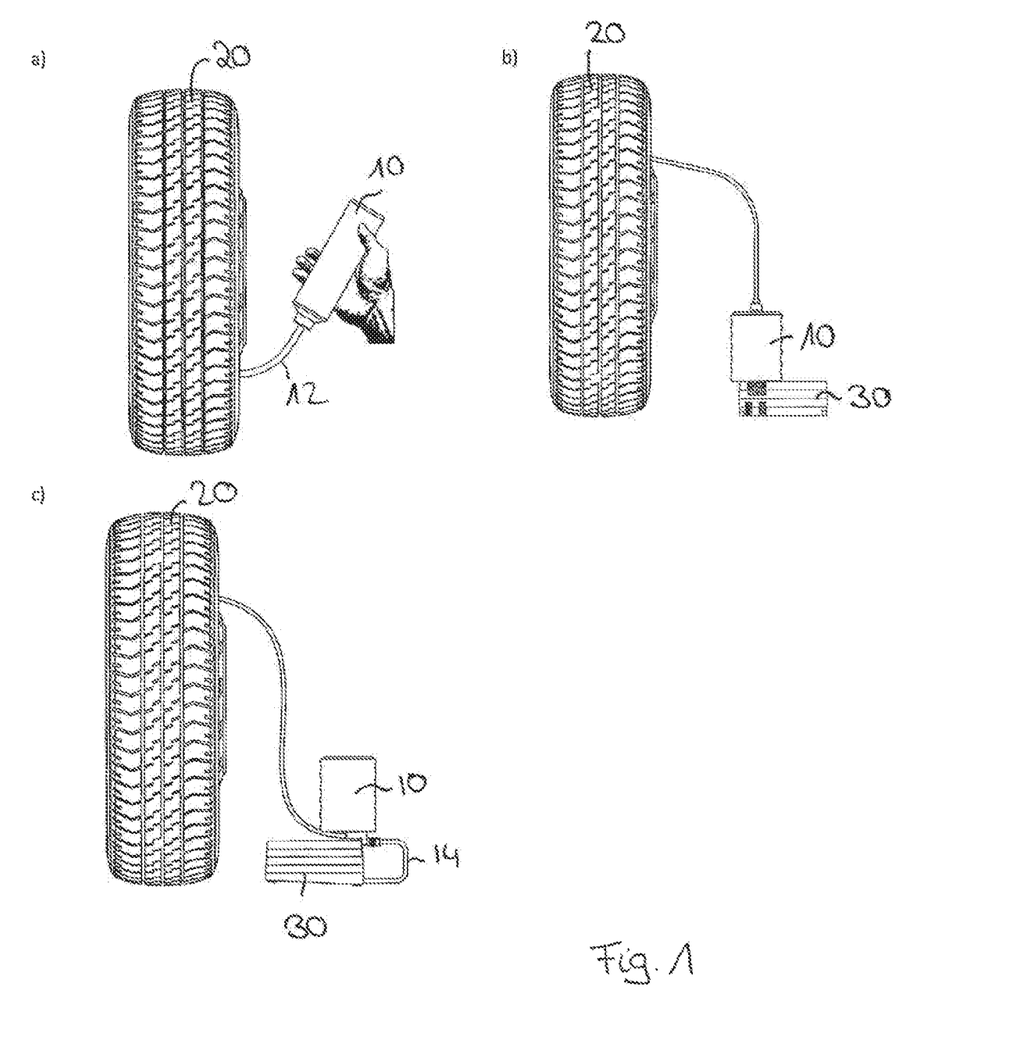
FIG. 1 shows a design according to the prior art.

FIG. 1 shows, in three illustrations, a design as is known as prior art. In illustration a, for example, what is known as the standard system is shown with a sealing liquid container which is compressed by compression so that the sealing liquid can be introduced into a pneumatic tire 20 via a tire valve. The sealing liquid container, here the sealant bottle, is provided with the reference sign 10. The connection is made by a connection device 12, here a hose, which is coupled to the sealing liquid container 10 and can be connected to the tire valve at its second end. Comfort solutions are understood to be those shown in Fig. b and c, where the sealing liquid container 10 in Fig. b can be coupled directly to a compressor 30 and, in the system shown in Fig. c, can be connected to the compressor 30 via a further connecting element 14. The systems shown in Fig. B and C require less force on the part of the user, but the sealing liquid and the additional air for distribution enter via a compressor, the compressed air being passed through the sealing liquid container 10.

Figure 2:
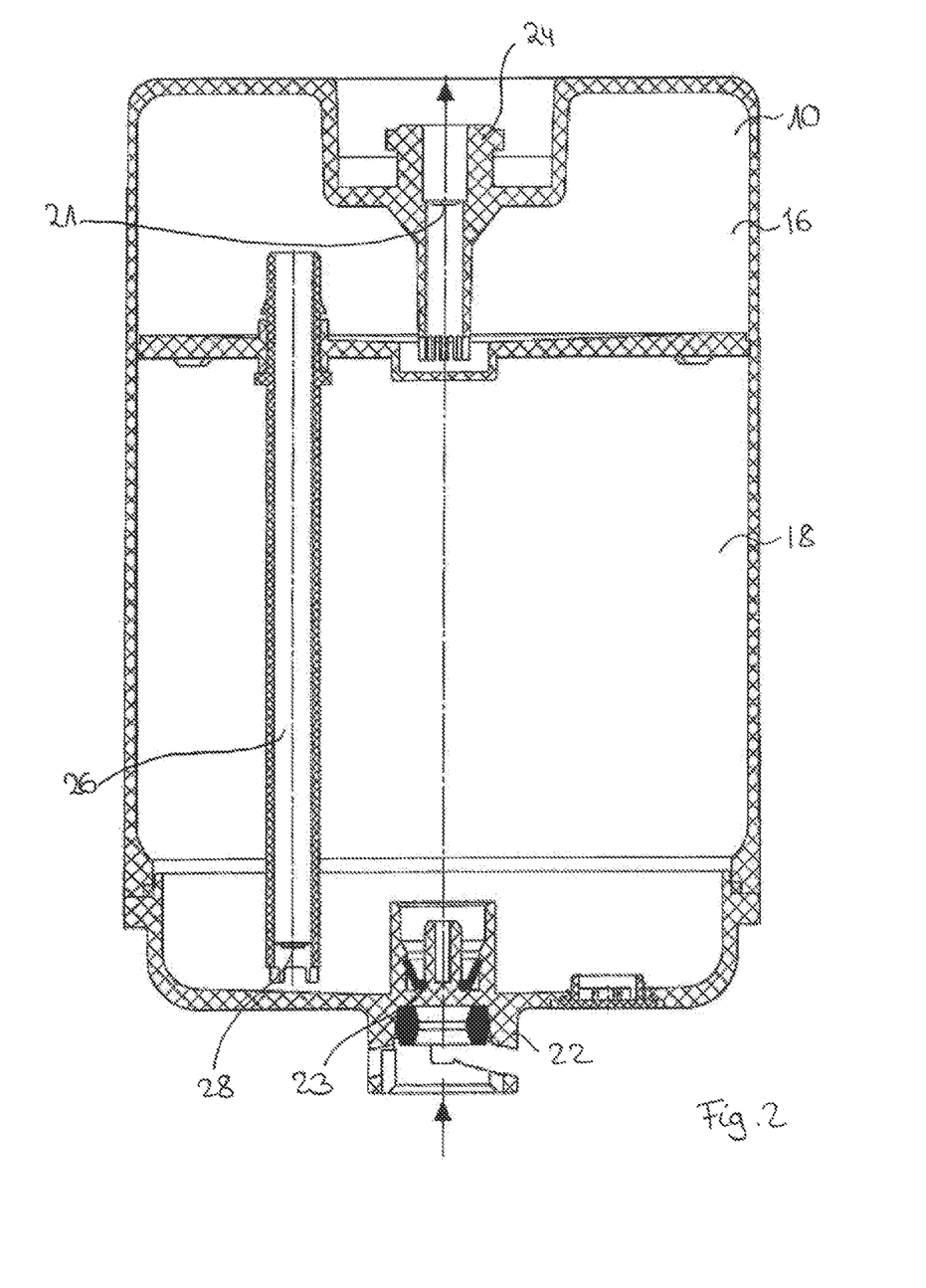
FIG. 2 is a cross-section through a sealing liquid container according to the invention.

FIG. 2 now shows the embodiment according to the invention of the sealing liquid container 10, which is divided into two chambers 16 and 18 here. The two chambers 16, 18 contain different components of the sealing liquid, namely in the present case the latex-natural rubber component in the chamber 16 and all the other components of the sealing liquid in the chamber denoted by 18. Alternatively, the latex-natural rubber component can also be arranged in the chamber 18 and the other components in the chamber 16. In this way, components, in particular latex, can be saved and a more optimal mixing ratio can be used which is able to provide a more intensive reaction when in use, which then ensures a better seal. In particular, by storing the components separately, a premature reaction can be prevented, which has a favorable effect on the storage stability. In addition, the sealing liquid container 10 has an air inlet opening 22 and an outlet opening 24 as well as a connecting element 26 between the chambers 16 and 18. The connecting element 26 is closed in the storage state via a closure element 28, as is the outlet opening 24, the closure element being denoted there by 21. If a compressor 30 is now coupled to the air inlet opening 22 of the container 10, then the air enters the chamber 18 and the pressure applied destroys the closure element 28, which has a corresponding predetermined breaking point for this purpose. The introduced compressed air, together with the components of the sealing liquid located in chamber 18, then enters the chamber 16 through the connecting element 26 and mixes there with the latex located therein. The closure element 21 is then also destroyed along its predetermined breaking point, so that the compressed air, together with the mixed components of the sealing liquid, is introduced through the outlet opening 24 into a hose 12 as a connection device and via this into the tire 20 via the tire valve. The inlet opening 22 with the valve 23 provided there is explained in more detail below with reference to FIGS. 6 and 7.

Figure 3:
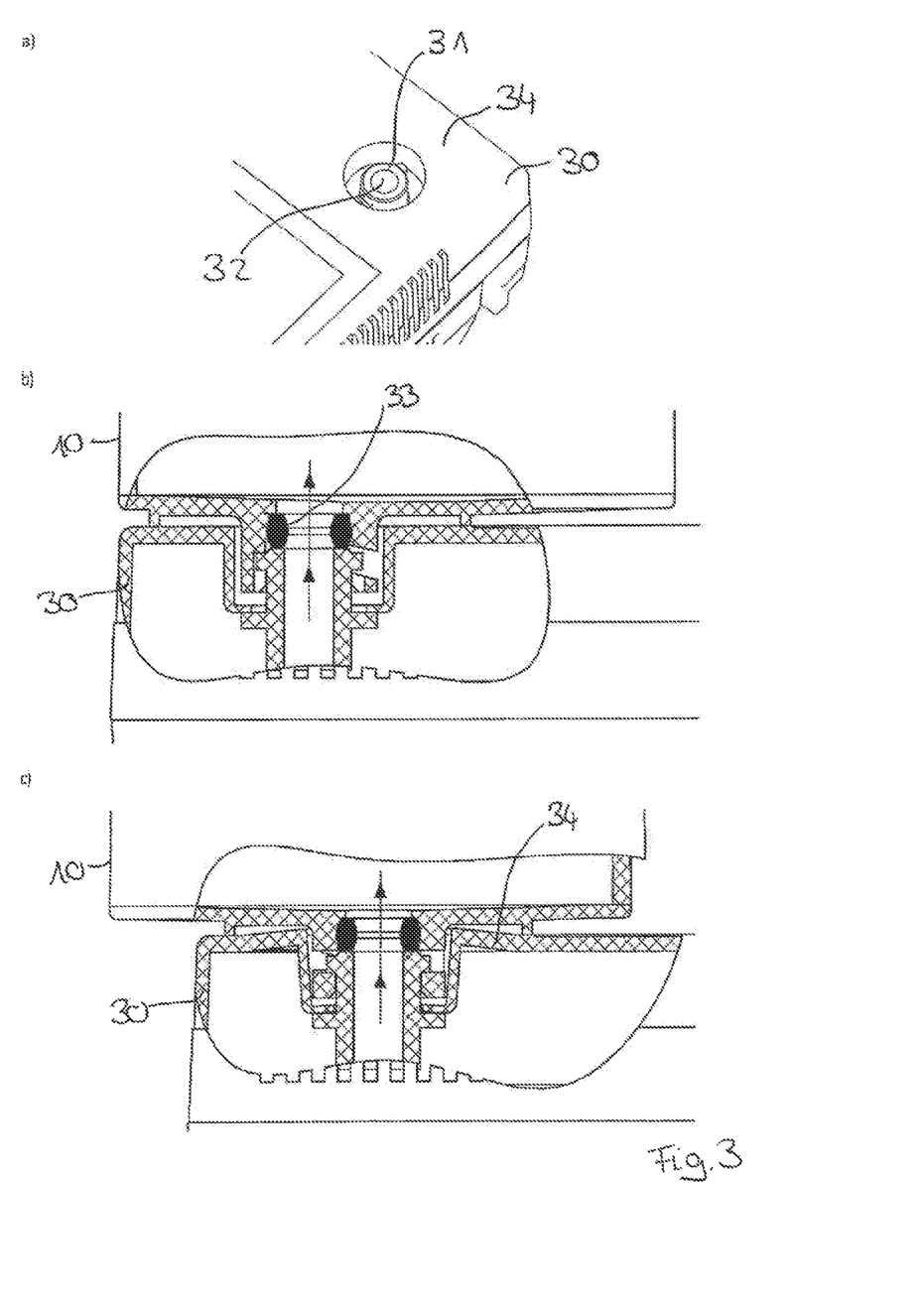
FIG. 3 shows a first embodiment of a coupling between the sealing liquid container and the compressor.
Figure 4:
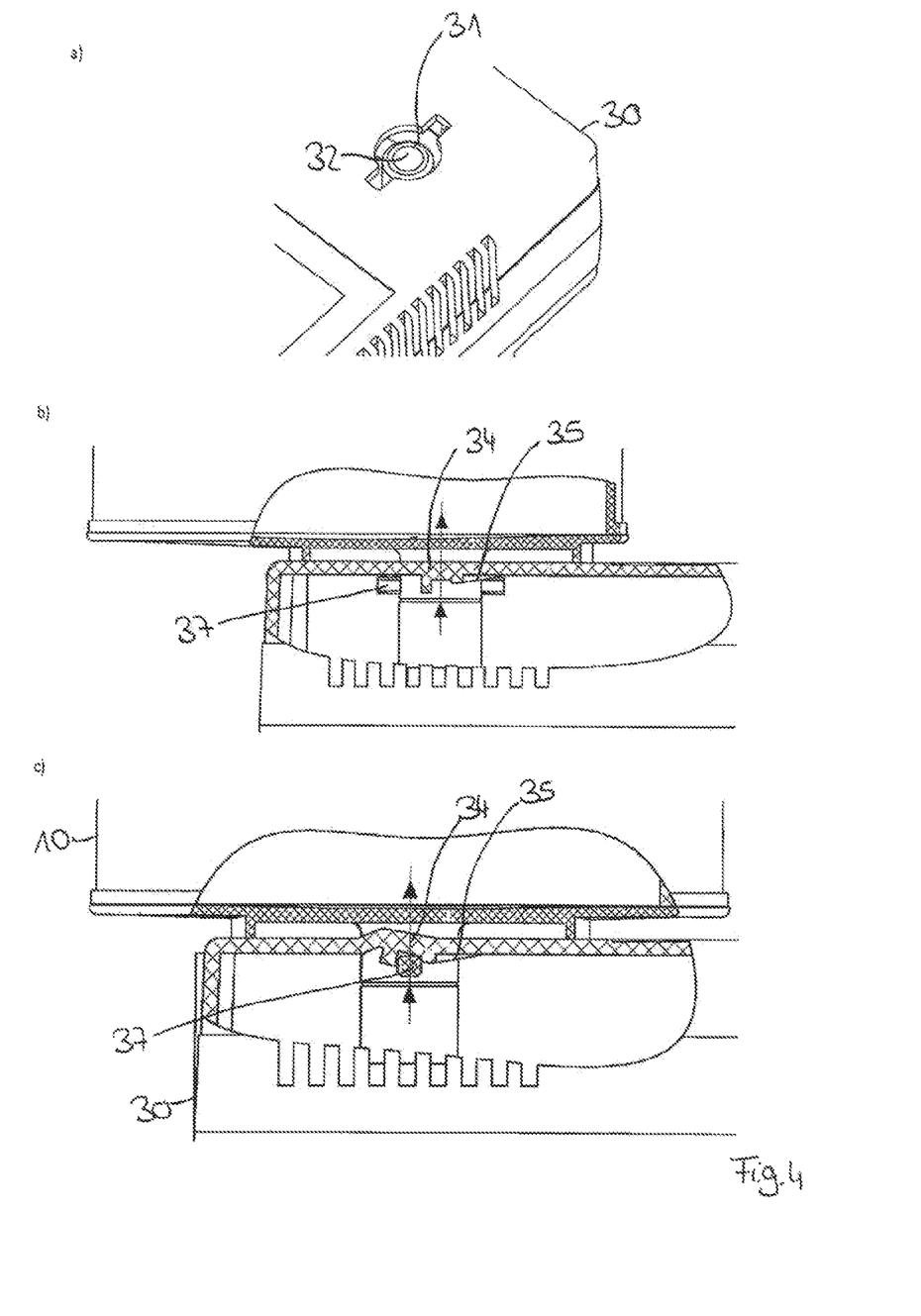
FIG. 4 shows an alternative embodiment to FIG. 3.

FIG. 3 and FIG. 4 now show two possibilities of coupling between the compressor 30, which has what is known as a coupling device 31, which is assigned to the air outlet 32 of the compressor 30, and the sealing liquid container 10. It is important that the sealing liquid container 10 and the compressor 30 are securely connected to one another in order to ensure the leak-free entry of the compressed air into the sealing liquid container 10 and to prevent sealing liquid from escaping at the connection point.

FIG. 3 shows a design in which a housing wall 34 of the compressor 30 in the immediate vicinity of the coupling device 31 serves as a tension spring. Illustration B in FIG. 3 shows a non-coupled representation in which the sealing liquid container 10 is merely placed on the compressor 30. The coupling device 31 rests against a seal 33 in the air inlet opening 22 of the container 10. The connection is now rotary, i.e. the container 10 is locked by means of a bayonet clamping guide, in which case the housing wall 34 bends, so that the container 10 and the compressor 30 are frictionally connected to one another under pretension.

FIG. 4 now shows an alternative view, with a clamping ramp 35 molded onto the housing of the compressor 34, so that the housing wall 34 bends when the container 10 is rotationally coupled to the compressor 30. This clamping ramp 35 interacts with a clamping spigot 37 of the container 10 in a clamping manner.

Figure 5:
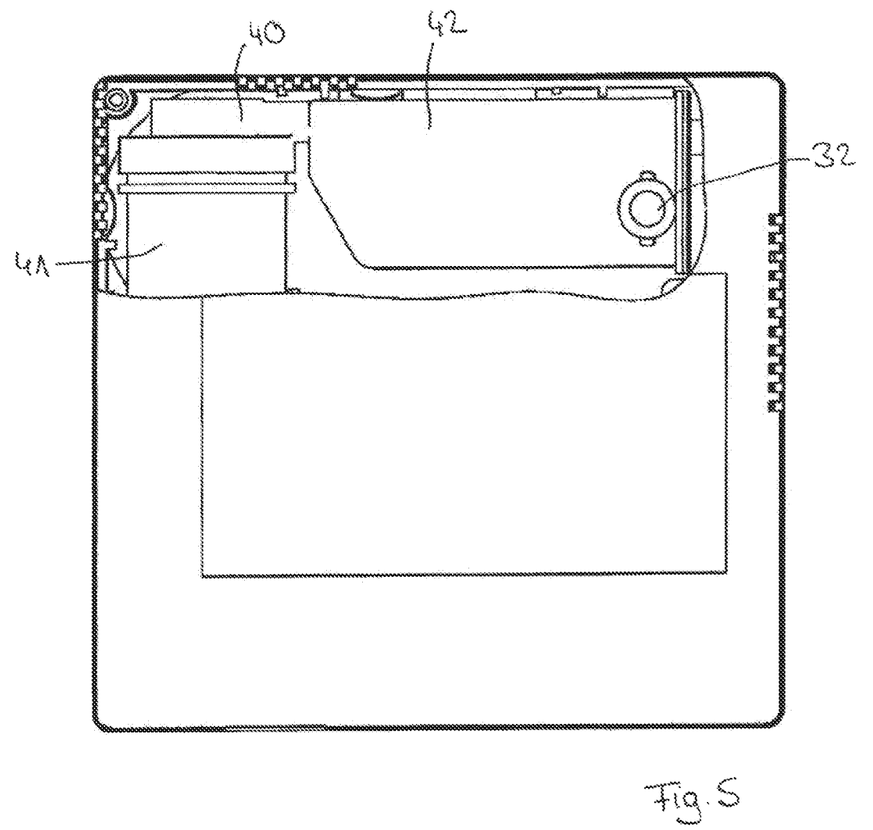
FIG. 5 is a cutaway view of a design of the compressor.

FIG. 5 is a cutaway view of the compressor. The problem with compressors is that the air escaping at the air outlet 40 of the compressor has a comparatively high temperature due to the compression. According to the invention, the air can therefore be cooled using a cooling device 42. Such a cooling device 42 can consist, for example, in cooling channels or further cooling surface geometries through which the air escaping from the cylinder 41 is guided in order to cool it down until it reaches the air outlet 32. In this way, it is possible to ensure that the reaction between the participating components of the sealing liquid does not already occur in a misdirected manner and in particular does not take place when entering through a tire valve and possibly clog said valve.

Figure 6:
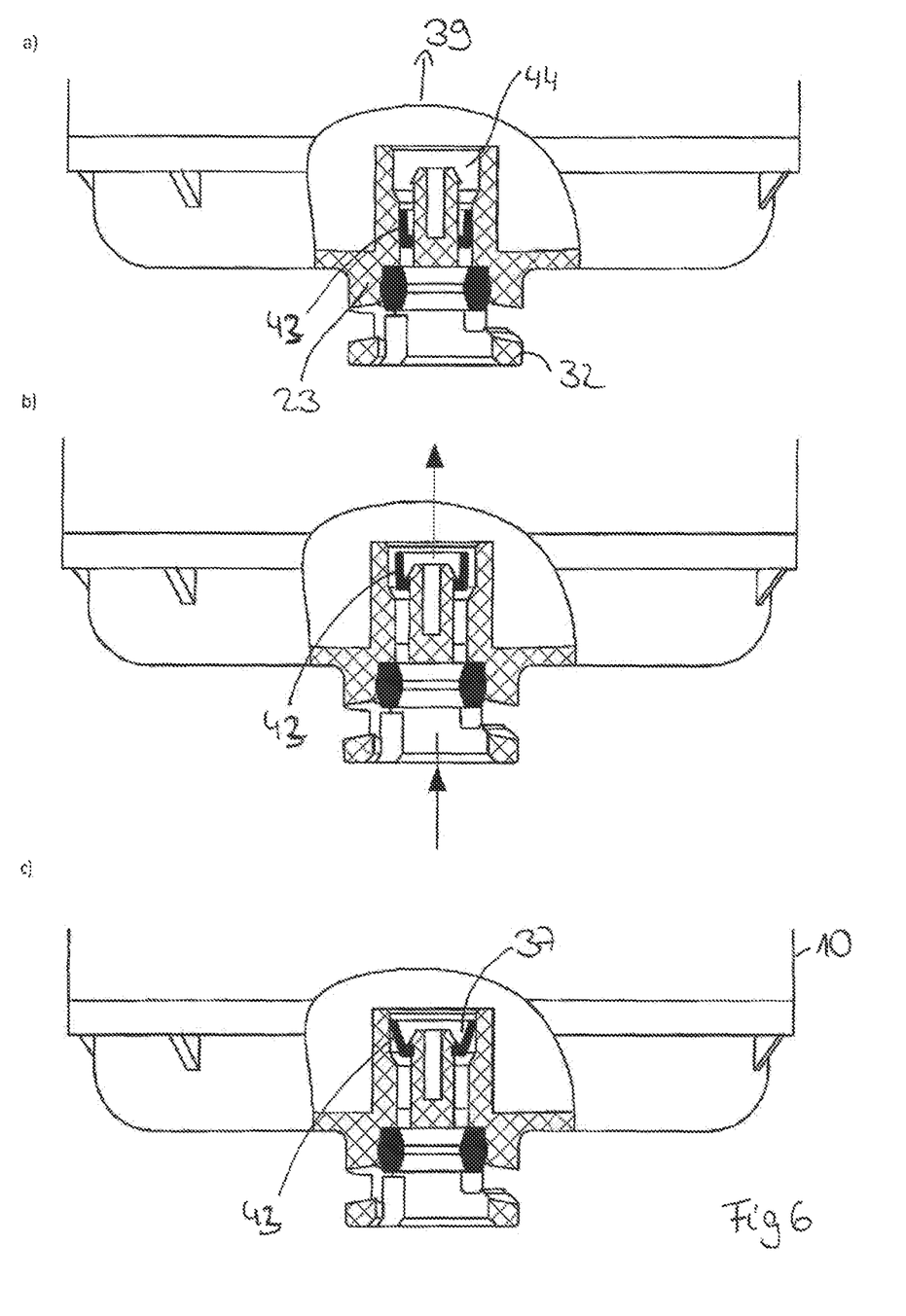
FIGS. 6 and 7 show embodiments of an air inlet valve of the sealing liquid container.
Figure 7:
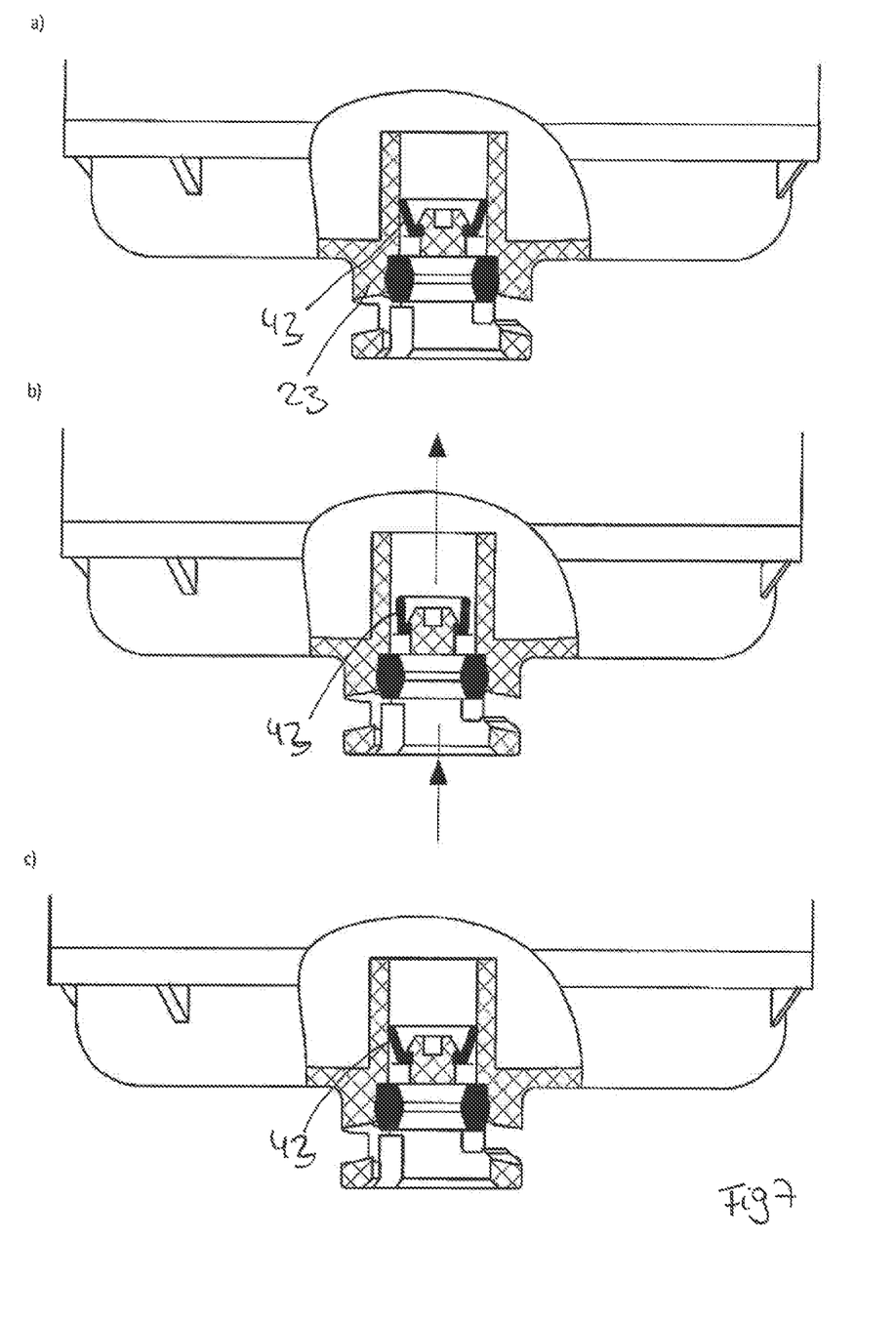

A preferred embodiment of the air inlet valve 23 of the sealing liquid container 10 is now shown in FIGS. 6 and 7. In particular, this also relates to the interaction with the air outlet 32 of the compressor 30.

FIG. 6 therefore shows the closed valve 23 in illustration a and the open valve 23 during the process in illustration b. In illustration c, a locked position is then shown after the filling process. As can be clearly seen, the valve has an element 43 which can be displaced in the axial direction 39, the displacement being effected by the incoming air flow. This means that the compressor pressure opens the valve 23 and moves the element 43 into a region of a larger valve cross-section 44 as can be seen in illustration b. Due to the pressure applied, the element 43 substantially retains its shape. At the end of the filling process and thus the end of the application of a compression pressure, the element 43 is deformed, such that it also sealing closes the region of the larger cross-section 44. This has the result that after the end of the filling process of the sealing liquid into a tire, the sealing liquid container 10 can be separated from the compressor 30 without the risk of sealing liquid escaping.

An alternative design is also shown in three illustrations in FIG. 7. Illustration a shows a closed valve and illustration b shows an open valve and illustration c shows a valve that is closed again. In contrast to FIG. 6, the closure element 43 is not displaced, but an air passage is opened only by elastic deformation of the element 43 in illustration b of FIG. 7, so that the air can flow laterally past the element 43. If the air flow is no longer present, the element 43 is returned to its original shape and closes the air passage again.

The invention claimed is:

1. A device for sealing pneumatic tires, comprising:
   a sealing liquid;
   a sealing liquid container having an air inlet opening for connection to a compressor and an outlet opening for the discharge of an air and/or the sealing liquid into a pneumatic tire to be sealed;
   the sealing liquid container having at least two chambers in which components of the sealing liquid that are reactive to one another are stored separately, the chambers being separated from one another by a closed connecting element which is configured to be opened via a pressure and/or an air flow from the air inlet opening to the outlet opening; and
   a valve characterized in that the valve is designed such that in the event of sufficient predetermined pressure from the compressor via the air inlet opening, the valve opens, and the sealing liquid container is designed such that the air flows from a first chamber of the at least two chambers into a second chamber of the at least two chambers and from the second chamber into the tire via the outlet opening, the sealing liquid container being designed such that the components of the sealing liquid are mixed in the second chamber.

2. The device according to claim 1, characterized in that when the sealing liquid container and the compressor are coupled, there is elastic deformation and a frictional connection between the compressor and the sealing container.

3. The device according to claim 2, characterized in that the elastic deformation is formed by a bayonet clamping guide which interacts with a clamping bolt or a clamping spigot.

4. The device according to claim 1, characterized in that the sealing liquid comprises a latex-natural rubber proportion in one of the chambers and the latex-natural rubber proportion comprises less than 50 wt. %.

5. The device according to claim 1, characterized in that the sealing liquid comprises at least one of a mineral, synthetic fibers or particles.

6. The device according to claim 1, characterized in that the sealing liquid comprises foam additives and/or evaporation agents.

7. The device according to claim 1, characterized in that the air inlet opening of the sealing liquid container is configured to be directly coupled to an air outlet of the compressor.

8. The device according to claim 1, characterized in that the outlet opening is closed by means of a closure which is configured to be destroyed when in use by the air flow and/or a connection means for connecting to the pneumatic tire.

9. The device according to claim 4-8, characterized in that the closure has a predetermined breaking point.

10. The device according to claim 1, characterized in that the air inlet opening has the valve which opens due to the air inflow from the compressor into the sealing liquid container and closes when the sealing liquid container is separated from the compressor.

11. The device according to claim 1, characterized in that the valve has an elastically deformable element which, in a deformed state, opens a path for the air.

12. The device according to claim 11, characterized in that the elastically deformable element is displaceably guided in the valve between a smaller cross-section in which the valve is closed and a larger cross-section in which the valve is opened by the air flow.

13. The device according to claim 1, characterized in that a cooling device for cooling the air flow in the compressor is provided in the compressor.

14. The device according to claim 1, characterized in that the sealing liquid container is produced by injection molding.

15. The device according to claim 2, characterized in that the elastic deformation is formed by a clamping ramp which interacts with a clamping bolt or a clamping spigot.

* * * * *